US012315685B2

(12) United States Patent
Liang et al.

(10) Patent No.: US 12,315,685 B2
(45) Date of Patent: May 27, 2025

(54) SPECIALIZED KEYBOARD KEYCAPS

(71) Applicant: Hewlett-Packard Development Company, L.P., Spring, TX (US)

(72) Inventors: Wei-Min Liang, Fountain Valley, CA (US); Huaichung Hsu, Fountain Valley, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/563,829

(22) PCT Filed: May 28, 2021

(86) PCT No.: PCT/US2021/034933
§ 371 (c)(1),
(2) Date: Nov. 22, 2023

(87) PCT Pub. No.: WO2022/250700
PCT Pub. Date: Dec. 1, 2022

(65) Prior Publication Data

US 2024/0234046 A1 Jul. 11, 2024

Related U.S. Application Data

(63) Continuation of application No. 17/331,208, filed on May 26, 2021, now abandoned, and a continuation of application No. 17/334,010, filed on May 26, 2021, now abandoned.

(51) Int. Cl.
*H01H 13/04* (2006.01)
*H01H 13/14* (2006.01)

(52) U.S. Cl.
CPC ............ *H01H 13/04* (2013.01); *H01H 13/14* (2013.01)

(58) Field of Classification Search
CPC ...... H01H 13/04; H01H 13/14; H01H 13/023; H01H 13/70; H01H 13/10; H01H 13/12; H01H 13/78; H01H 13/80; H01H 13/81; H01H 13/86; H01H 3/12
See application file for complete search history.

(56) References Cited

U.S. PATENT DOCUMENTS 4,968,860 A 11/1990 Shinohara et al.
5,199,556 A 4/1993 Lee
5,310,973 A 5/1994 Lee
7,180,025 B2 2/2007 Kuwana et al.
8,013,266 B2 * 9/2011 Xu ........................ H04M 19/04 200/341
8,080,751 B2 12/2011 Onuki et al.
9,640,346 B2 5/2017 Cai
(Continued)

FOREIGN PATENT DOCUMENTS

KR 10-2016-0003029 A 1/2016
WO 2019/205168 A1 10/2019

*Primary Examiner* — Lheiren Mae A Caroc
(74) *Attorney, Agent, or Firm* — Quarles & Brady LLP

(57) ABSTRACT

Keycaps for use in association with key switches that facilitate the creation of custom keyboards. Mechanical keyboards feature key switches having standardized top portions that make it possible to fit a wide variety of different keycaps thereon. Specialized, electronic keycaps can introduce different functionalities to improve keyboard customizability. Keycaps can include haptic feedback mechanisms. Keycaps can include a display screen.

19 Claims, 3 Drawing Sheets

(56) References Cited

U.S. PATENT DOCUMENTS

| | | | | |
|---|---|---|---|---|
| 10,431,402 | B2 * | 10/2019 | Hsieh ..................... | H01H 13/10 |
| 11,069,491 | B2 * | 7/2021 | Huang ................... | H01H 13/14 |
| 11,404,224 | B1 * | 8/2022 | Yu .......................... | H01H 13/70 |
| 11,869,729 | B2 | 1/2024 | Chang | |
| 2009/0321241 | A1 | 12/2009 | Zhen | |
| 2013/0026017 | A1 | 1/2013 | Verdú Martínez et al. | |
| 2015/0136577 | A1 | 5/2015 | Chu | |
| 2017/0148594 | A1 | 5/2017 | Feng | |
| 2018/0137994 | A1 | 5/2018 | Liao et al. | |
| 2018/0233307 | A1 | 8/2018 | Sundaresan et al. | |
| 2019/0115167 | A1 | 4/2019 | Sheng | |

* cited by examiner

SPECIALIZED KEYBOARD KEYCAPS

FIELD OF THE INVENTION

The field of the invention is keycaps for keyboards.

BACKGROUND

The background description includes information that may be useful in understanding the present invention. It is not an admission that any of the information provided in this application is prior art or relevant to the presently claimed invention, or that any publication specifically or implicitly referenced is prior art.

Early keyboards were known, in part, for the sound the keys made when pressed. The recognizable clicking was the result of each key being configured as an actual physical switch that, when actuated, resulted in creating an electrical signal or closing/opening a circuit that a computer interpreted as a key press. Now, many custom keyboards are built with mechanical key switches or key switches designed to imitate the feel of a mechanical key switch. Enthusiasm for custom keyboards has grown dramatically in recent years, culminating in an entirely new industry growing up around custom keyboards that can be made using custom keycaps. Key caps can fit onto a variety of key switches having standardized connection components atop a plunger portion, where the standardized connection component is generally made as a part of the plunger.

But current technologies limit customizability and functionality to cosmetic changes brought about by switching out the purely mechanical keycaps. Current technologies fail to take advantage of improved customizability that can result from key switches that can accommodate specialized electronic keycaps. Moreover, existing switches that do feature screens are not built to expand into entire keyboards using existing standards for, e.g., mechanical keyboard key switches.

For example, U.S. Pat. No. 8,080,751 is directed to push button switches having small displays. This patent fails to contemplate features that facilitate hobbyists to create entire custom mechanical keyboards, such as specialized keycaps that introduce fully electronic and customizability for those keycaps. There thus exists a need in the art for improved keycaps that make further customization of keyboards beyond what is currently possible with ordinary keycaps.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

SUMMARY OF THE INVENTION

The present invention provides apparatuses, systems, and methods directed to specialized keycaps for customizable keyboards. In one aspect of the inventive subject matter, an electronic keycap comprises: an electronic top; a cap body; a cross-shaped coupler disposed within the cap body; a first conductive region, a second conductive region, a third conductive region, and a fourth conductive region; where at least a portion of the first conductive region couples with the cross-shaped coupler and forms a first interior surface of the cross-shaped coupler; where at least a portion of the second conductive region couples with the cross-shaped coupler and forms a second interior surface of the cross-shaped coupler; where at least a portion of the third conductive region couples with the cross-shaped coupler and forms a third interior surface of the cross-shaped coupler; where at least a portion of the fourth conductive region couples with the cross-shaped coupler and forms a fourth interior surface of the cross-shaped coupler; where the first conductive region comprises a first nub, the second conductive region comprises a second nub, the third conductive region comprises a third nub, and the fourth conductive region comprises a fourth nub; where the electronic top comprises a first slot, a second slot, a third slot, and a fourth slot; and where the electronic top couples with the cap body at least in part by coupling the first nub with the first slot, the second nub with the second slot, the third nub with the third slot, and the fourth nub with the fourth slot.

In some embodiments, the cross-shaped coupler is made from a non-conductive material. The nubs can all be, e.g., soldered or pressure fit into the slots of the electronic top. In some embodiments, the electronic top comprises a display screen, in some embodiments, the electronic top comprises a haptic feedback mechanism, and in some embodiments the electronic top can include both.

In another aspect of the inventive subject matter, an electronic keycap comprises: an electronic top; a cap body; a cross-shaped coupler disposed within the cap body; at least one conductive region coupled with the cross-shaped coupler to form a surface of the cross-shaped coupler; where the at least one conductive region comprises a nub; and where the electronic top couples with the cap body such that the nub creates an electrical connection with a conductive portion of the electronic top.

In some embodiments, the cross-shaped coupler is made from a non-conductive material. The conductive portion of the electronic top can include a slot, and the nub can be soldered to the slot. In some embodiments, the nub is pressure fit into the slot. In some embodiments, the nub is soldered to the conductive portion of the electronic cap. The electronic top can include a display screen, a haptic feedback mechanism, or both.

In another aspect of the inventive subject matter, an electronic keycap comprises: an electronic top; a cap body; a cross-shaped coupler disposed within the cap body; the cross-shaped coupler comprising at least one conductive region; and where the electronic top couples with the cap body such that the at least one conductive region creates an electrical connection with a conductive portion of the electronic top.

In some embodiments the cross-shaped coupler is made from a non-conductive material. The conductive portion of the electronic top can include a slot, and, in some embodiments a portion of the at least one conductive region is soldered to the slot, while in other embodiments, a portion of the at least one conductive region is pressure fit into the slot.

One should appreciate that the disclosed subject matter provides many advantageous technical effects including the ability to form a serial connection between a keycap of the inventive subject matter and a specialized key switch.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
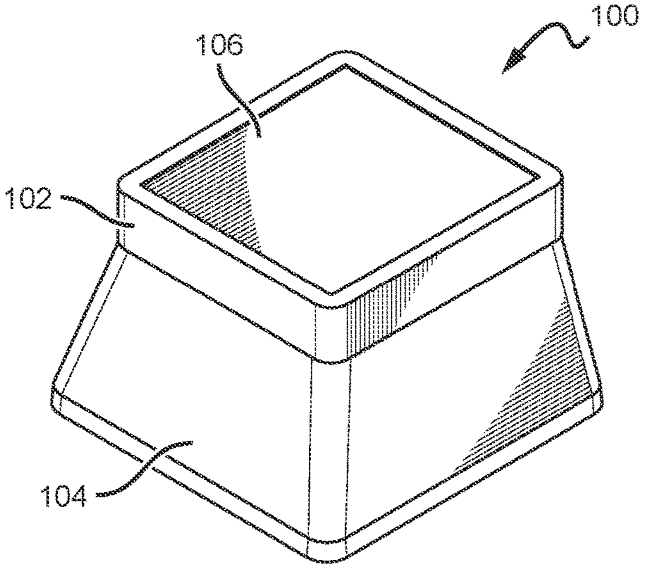
FIG. 1 is an isometric view of a keycap of the inventive subject matter.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

Custom keyboards-especially custom mechanical keyboards—can feature many different key switches that can each accommodate custom key caps. This type of keyboard has become widely popular especially among enthusiasts, but there remains a need for further customizable keyboards. Currently, keyboard customization focuses primarily on custom keycaps that allow users to assemble unique keyboards with unique looks, with those looks dependent on the keycaps that user selects to put on their keyboard. These types of keyboards often introduce additional customization by adding colored lights that light up the keyboard and keycaps thereon. Additional customization can be introduced by creating electronic, programmable keycaps that feature, e.g., haptic feedback mechanisms or display screens. The inventive subject matter is directed to keyboard keycaps that electronically connect with each key switch that they couple with, thus making a wide variety of electronic, programmable keycaps possible.

Specialized electronic keycaps of the inventive subject matter can facilitate the creation of massively customizable keyboards. For example, keyboards featuring keycaps of the inventive subject matter that each have a display screen could be used to create keyboard that can be easily reconfigured from QWERTY to DVORAK. Keyboards can be programmed to show emojis, to show images, etc.

FIG. 1 shows an isometric view of a keycap of the inventive subject matter. Keycap 100 features electronic top 102 and cap body 104 (in some embodiments, electronic top 102 and cap body 104 can be formed together instead of separate components). Electronic top 102 can be configured in a variety of different ways, depending on desired effects, behaviors, etc. For example, in some embodiments, electronic top 100 can feature a display screen on its top surface 106 (e.g., display screen beneath a protective surface such as glass or another protective material). In some embodiments, electronic top 100 can include one or more vibrating elements that facilitate haptic feedback. Vibrating elements can include, e.g., piezoelectric elements configured to create vibrations for haptic feedback and off-center mass rotational elements. Smaller elements such as piezoelectric vibration components can be more useful in embodiments of the inventive subject matter considering size constraints. In some embodiments, electronic top 102 can include both a vibrating element and a display screen. Display screens can include, e.g., OLED screens and screens that can conform to ordinary curvature of keycaps. Although keycap 100 is shown as a symmetrically designed component, embodiments can be created according to ordinary keycap shapes, which vary across an ordinary keyboard depending on key switch locations (e.g., different surface curvatures, surface angles, etc.).

Electronic top 102 is coupled to cap body 104. Making these components separately and able to be coupled together makes it possible to create all kinds of different keycaps using the same cap body with different electronic tops. Cap body 104 comprises four conductive elements 108, which are configured to couple both with electronic top 102 as well as to form portions of a cross-shaped coupler 110 disposed within keycap 100. Other portions of keycap 100 (e.g., portions outside of conductive regions 108) should be made from one or more insulating materials. By using insulating materials for other portions of keycap 100, electricity passing through any one conductive region 108 is prevented from short circuiting into a neighboring conductive region 108. This allows for each of the conductive regions 108 to correspond to, e.g., different pins required for serial communication (e.g., USB or another serial data standard). For example, in some embodiments one of the conductive regions can correspond to a $V_{BUS}$ (or $V_{CC}$, depending on implementation/communication protocol) line, another to signal pin 1 (e.g., D+), another to GND, and yet another to signal pin 2 (e.g., D−).

Figure 2:
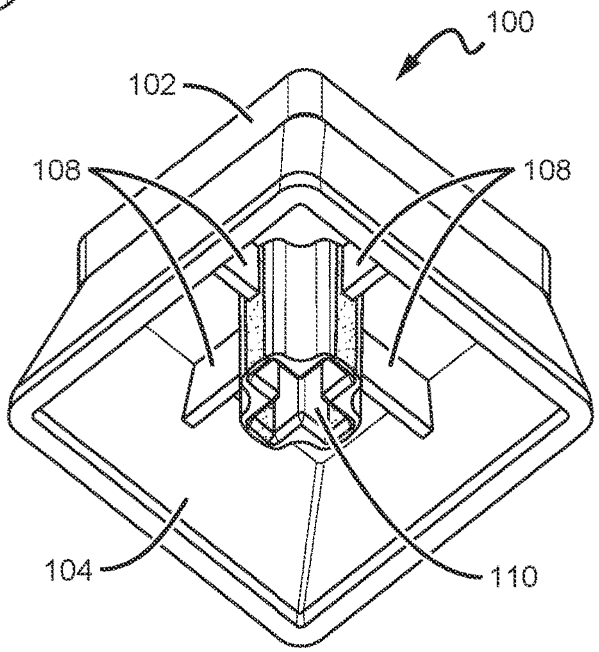
FIG. 2 is a bottom isometric view thereof.

As shown in FIG. 2, conductive regions 108 included flared portions that extend from the cross-shaped coupler to interior walls of cap body 104. These flared portions create additional stability within cap body 104, both holding conductive regions 108 in place relative to cross-shaped coupler 110 as well as helping to create a more stable cross-shaped coupler 110. This can improve the ability of keycap 100 to be coupled and decoupled with key switches over the course of a keycap's lifetime, which can involve many cycles of coupling and decoupling. Thus, the lifetime of each keycap is improved by including the flanges on each conductive region 108. In some embodiments, flange portions of conductive regions 108 are made from one or more nonconductive materials.

Figure 3:
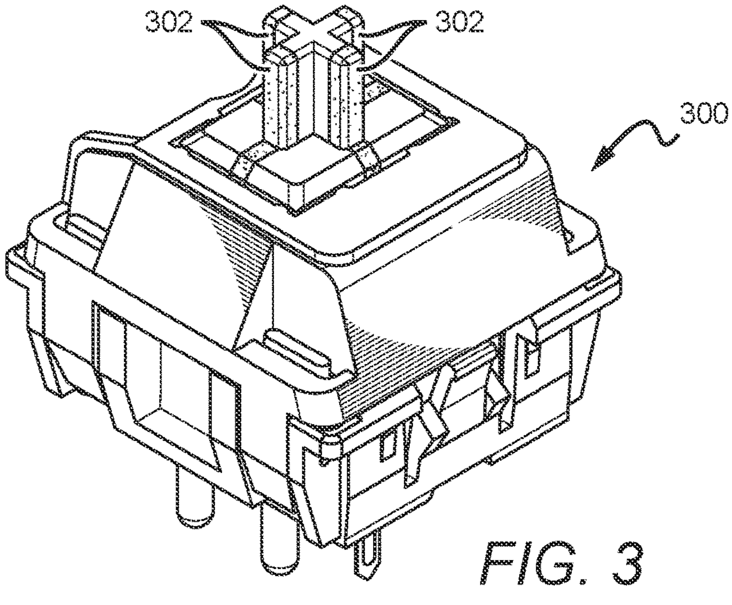
FIG. 3 shows a key switch that can facilitate use of keycaps of the inventive subject matter.

FIG. 3 shows an example of a key switch 300 that is designed for use in association with keycap 100. Key switch 300 features a plunger having a cross-shaped top portion with conductive ends 302. The cross-shaped top portion of the plunger is sized and dimensioned so that it can fit snugly within the cross-shaped coupler 110 of keycap 100. When keycap 100 is pressed down onto the cross-shaped top portion of the plunger of key switch 300, conductive regions 108 come into contact with conductive ends 302. In, for example, a keyboard featuring key switches like the one shown in FIG. 3 and keycaps of the inventive subject matter, conductive regions 108 facilitate electrical connections between electronic tops and, e.g., a printed circuit board that each key switch connects to. Such a configuration can be used to create a serial connection between a printed circuit board and electronic tops of keycaps of the inventive subject matter. The cross-shaped portions of both key switch 300 and keycap 100 are configured to confirm to industry standards for key switches and keycaps, thus facilitating the use of ordinary key caps even on specialized key switches like key switch 300.

Figure 4:
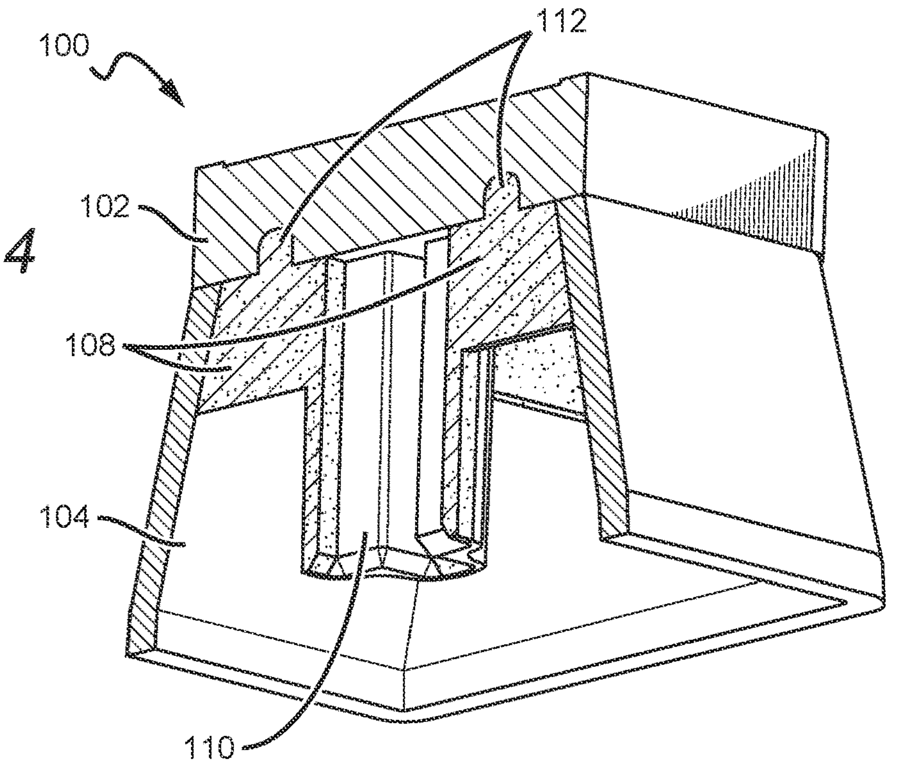
FIG. 4 shows a cutaway view of the keycap.

FIG. 4 shows a cutaway view of keycap 100, demonstrating how electronic top 102 creates electrical connections with conductive regions 108. Conductive regions 108 as shown in FIG. 4 feature nubs 112, and nubs 112 can, e.g., be pressure fit or soldered to electronic top 102. When nubs 112 are inserted into electronic top 102, as shown in FIG. 4, an electrical coupling is created, allowing electrical signals to pass between a key switch and electronic top 102 (e.g., when keycap 100 is fitted to a key switch like the one shown in FIG. 3). With electrical connections formed between a PCB and an electronic top, features such as display screens (e.g., OLED screens) and haptic feedback devices can be powered and operated.

Figure 5:
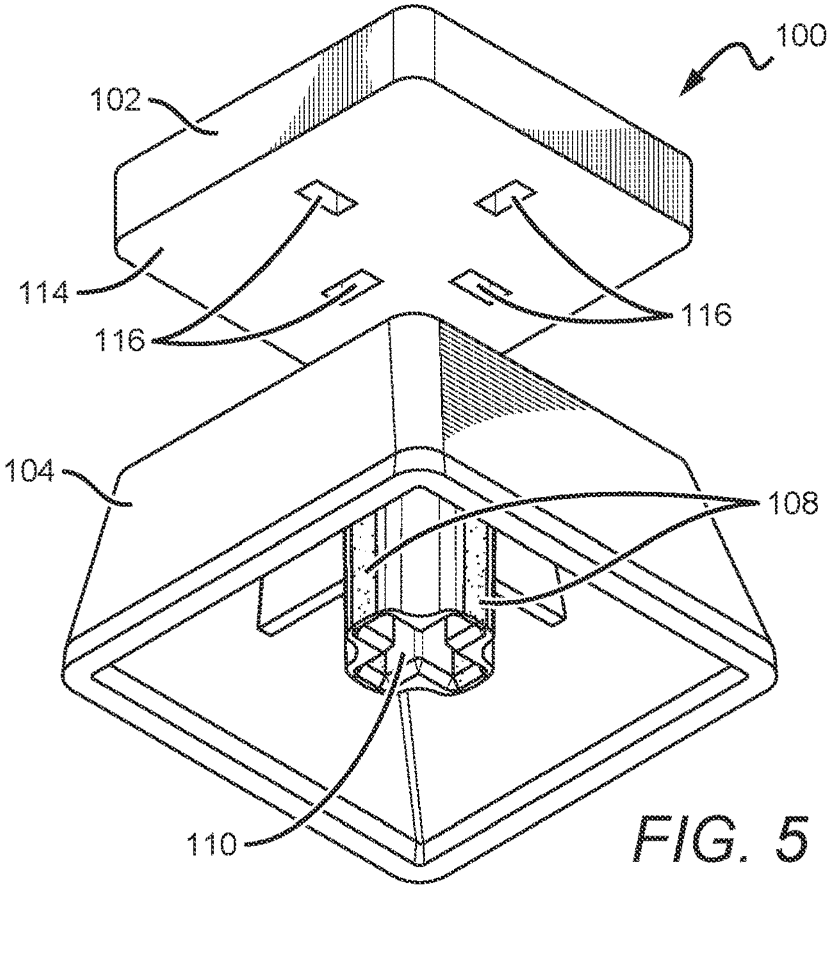
FIG. 5 shows an exploded view of the keycap.

FIG. 5 shows keycap 100 with electronic top 102 exploded out to show its bottom surface 114. Bottom surface 114 features four slots 116 that accommodate nubs 112 on conductive regions 108 in the cap body 104—this is best shown in FIG. 4. At least interior portions of slots 116 comprise one or more conductive materials to facilitate creating an electrical connection between nubs 112 and slots 116. Electronic top 102 can be coupled with cap body 104 by, e.g., an adhesive, soldering of nubs 112 to slots 116, pressure fit between nubs 112 and slots 116, clip-in mechanisms, etc. In embodiments where nubs 112 are pressure fit into slots 116, keycaps of the inventive subject matter can feature interchangeable electronic tops, allowing users to, for example, change a display screen electronic top with a haptic feedback electronic top.

Figure 6:
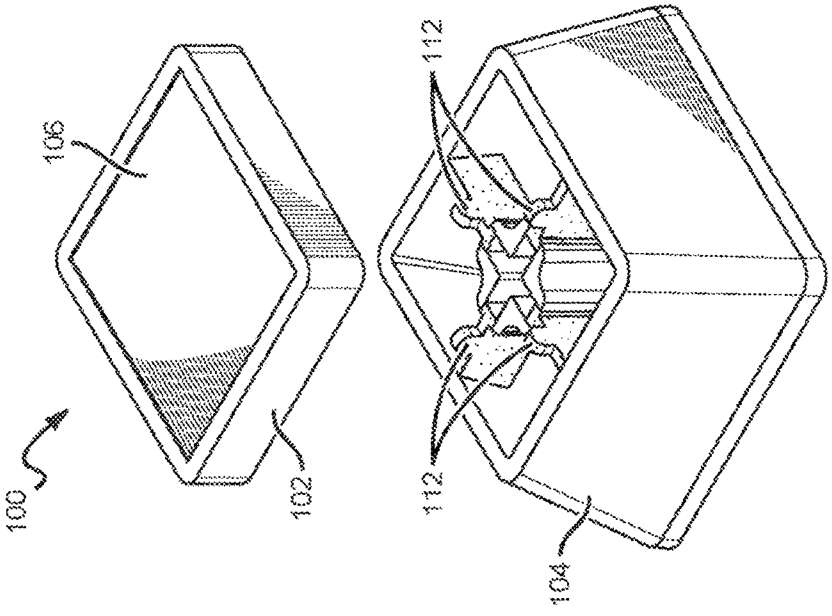
FIG. 6 shows another exploded view thereof.

FIG. 6 shows an alternative exploded view of keycap 100 as shown in FIG. 5. This view shows nubs 112 on each of the conductive regions 108 that are disposed within cap body 104. As described above, electronic cap 102 couples with cap body 104 via at least coupling nubs 112 with slots 116 on the underside of electronic cap 102.

Figure 7:
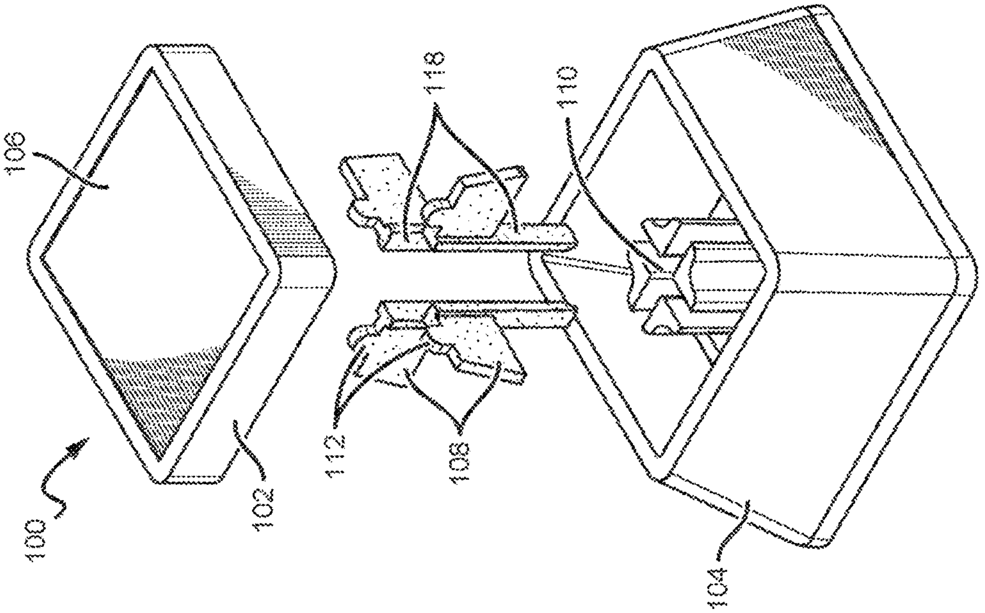
FIG. 7 shows another exploded view thereof.

FIG. 7 shows an exploded view of keycap 100 with conductive regions 108 exploded away from cap body 104. Each coupling region 108 comprises an elongated portion 118. These elongated portions 118 create interior surfaces of the cross-shaped coupler 110. Specifically, elongated portion 118 create interior surfaces on the ends of the cross portions of the cross-shaped coupler 110, thus ensuring electrical coupling with a cross-shaped plunger that fits therein, which in turn facilitates a connection between electronic cap 102 and a key switch that keycap 100 is coupled with.

Thus, specific systems and devices directed to specialized electronic keycaps have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. An electronic keycap comprising:

an electronic top;

a cap body;

a cross-shaped coupler disposed within the cap body;

a first conductive region, a second conductive region, a third conductive region, and a fourth conductive region;

wherein at least a portion of the first conductive region couples with the cross-shaped coupler and forms a first interior surface of the cross-shaped coupler;

wherein at least a portion of the second conductive region couples with the cross-shaped coupler and forms a second interior surface of the cross-shaped coupler;

wherein at least a portion of the third conductive region couples with the cross-shaped coupler and forms a third interior surface of the cross-shaped coupler;

wherein at least a portion of the fourth conductive region couples with the cross-shaped coupler and forms a fourth interior surface of the cross-shaped coupler;

wherein the first conductive region comprises a first nub, the second conductive region comprises a second nub, the third conductive region comprises a third nub, and the fourth conductive region comprises a fourth nub;

wherein the electronic top comprises a first slot, a second slot, a third slot, and a fourth slot; and wherein the electronic top couples with the cap body at least in part by coupling the first nub with the first slot, the second nub with the second slot, the third nub with the third slot, and the fourth nub with the fourth slot.

2. The electronic keycap of claim 1, wherein the cross-shaped coupler is made from a non-conductive material.

3. The electronic keycap of claim 1, wherein the first nub is soldered to the first slot, the second nub is soldered to the second slot, the third nub is soldered to the third slot, and the fourth nub is soldered to the fourth slot.

4. The electronic keycap of claim 1, wherein the first nub is pressure fit to the first slot, the second nub is pressure fit to the second slot, the third nub is pressure fit to the third slot, and the fourth nub is pressure fit to the fourth slot.

5. The electronic keycap of claim 1, wherein the electronic top comprises a display screen.

6. The electronic keycap of claim 1, wherein the electronic top comprises a haptic feedback mechanism.

7. An electronic keycap comprising:

an electronic top;

a cap body;

a coupler disposed within the cap body;

at least one conductive region coupled with the coupler to form a surface of the coupler;

wherein the at least one conductive region comprises a nub extending into the electronic top; and wherein the electronic top couples with the cap body such that the nub creates an electrical connection with a conductive portion of the electronic top.

8. The electronic keycap of claim 7, wherein the coupler is made from a non-conductive material.

9. The electronic keycap of claim 7, wherein the conductive portion of the electronic top comprises a slot.

10. The electronic keycap of claim 9, wherein the nub is soldered to the slot.

11. The electronic keycap of claim 9, wherein the nub is pressure fit into the slot.

12. The electronic keycap of claim 7, wherein the nub is soldered to the conductive portion of the electronic keycap.

13. The electronic keycap of claim 7, wherein the electronic top comprises a display screen.

14. The electronic keycap of claim 7, wherein the electronic top comprises a haptic feedback mechanism.

15. An electronic keycap comprising:

an electronic top coupled to a cap body; and a coupler disposed within the cap body, wherein a conductive region of the coupler is to electrically connect with a conductive portion of the electronic top, the conductive portion of the electronic top comprises a slot, and wherein a haptic feedback mechanism of the electronic top is to create a vibration.

16. The electronic keycap of claim 15, wherein a portion of the conductive region is soldered to the slot.

17. The electronic keycap of claim 15, wherein a portion of the conductive region is pressure fit into the slot.

18. The electronic keycap of claim 15, wherein an additional conductive region of the coupler is to electrically connect with another conductive portion of the electronic top.

19. The electronic keycap of claim 18, wherein a non-conductive portion of the coupler is between the conductive region and the additional conductive region.

* * * * *